United States Patent [19]

Hepworth

[11] Patent Number: 4,666,354

[45] Date of Patent: May 19, 1987

[54] MOULDED FIXING DEVICES

[75] Inventor: Paul S. Hepworth, Oadby, England

[73] Assignee: Plas Plugs, Ltd., England

[21] Appl. No.: 691,930

[22] Filed: Jan. 16, 1985

[30] Foreign Application Priority Data

Jan. 17, 1984 [GB] United Kingdom ............. 8401148

[51] Int. Cl.⁴ .................................... F16B 13/06
[52] U.S. Cl. .................................. 411/40; 411/61
[58] Field of Search ................ 411/61, 40, 42, 44, 411/57, 63, 62, 39, 60, 54, 64, 65, 66, 67, 68, 59; 24/459

[56] References Cited

U.S. PATENT DOCUMENTS

| | | | |
|---|---|---|---|
| 3,199,398 | 8/1965 | Weisz | 411/57 |
| 3,216,304 | 11/1965 | James | 411/40 |
| 3,248,998 | 5/1966 | Siegel | 411/67 |
| 3,518,915 | 7/1970 | Gutshall | 411/39 |
| 3,757,031 | 9/1973 | Izraeli | 24/459 X |
| 4,049,357 | 9/1977 | Hamisch | 24/459 X |
| 4,118,838 | 10/1978 | Schiefer | 24/459 X |
| 4,405,161 | 9/1983 | Young | 24/459 X |
| 4,407,618 | 10/1983 | Kimura | 411/40 |

FOREIGN PATENT DOCUMENTS

| | | | |
|---|---|---|---|
| 1154574 | 6/1969 | United Kingdom | 411/64 |
| 1309391 | 3/1973 | United Kingdom | 411/64 |

Primary Examiner—Gary L. Smith
Assistant Examiner—Adrian H. Whitcomb, Jr.
Attorney, Agent, or Firm—Frijouf, Rust & Pyle

[57] ABSTRACT

The disclosure concerns a fixing device for securing fasteners such as bolts into concrete or other similar material. The device comprises a sleeve member (2, 4) having a block portion (6) in which a nut (14) is set. The block portion (6) has a frusto-conical extension portion (16) joined by shearable links (18) to an intermediate portion (20) of the member which has an internal frusto-conical surface (22) complementing the extrusion portion (16) of the block portion. Tightening the bolt shears the links in the usual way. According to the present invention the device is moulded in two longitudinally divided portions (2) and (4), hinged together by a plastics hinge (10) adjacent the block portion (6). In the as-moulded conditions the portions (2, 4) are arranged end-to-end, but are hinged together to form the device ready for use.

4 Claims, 6 Drawing Figures

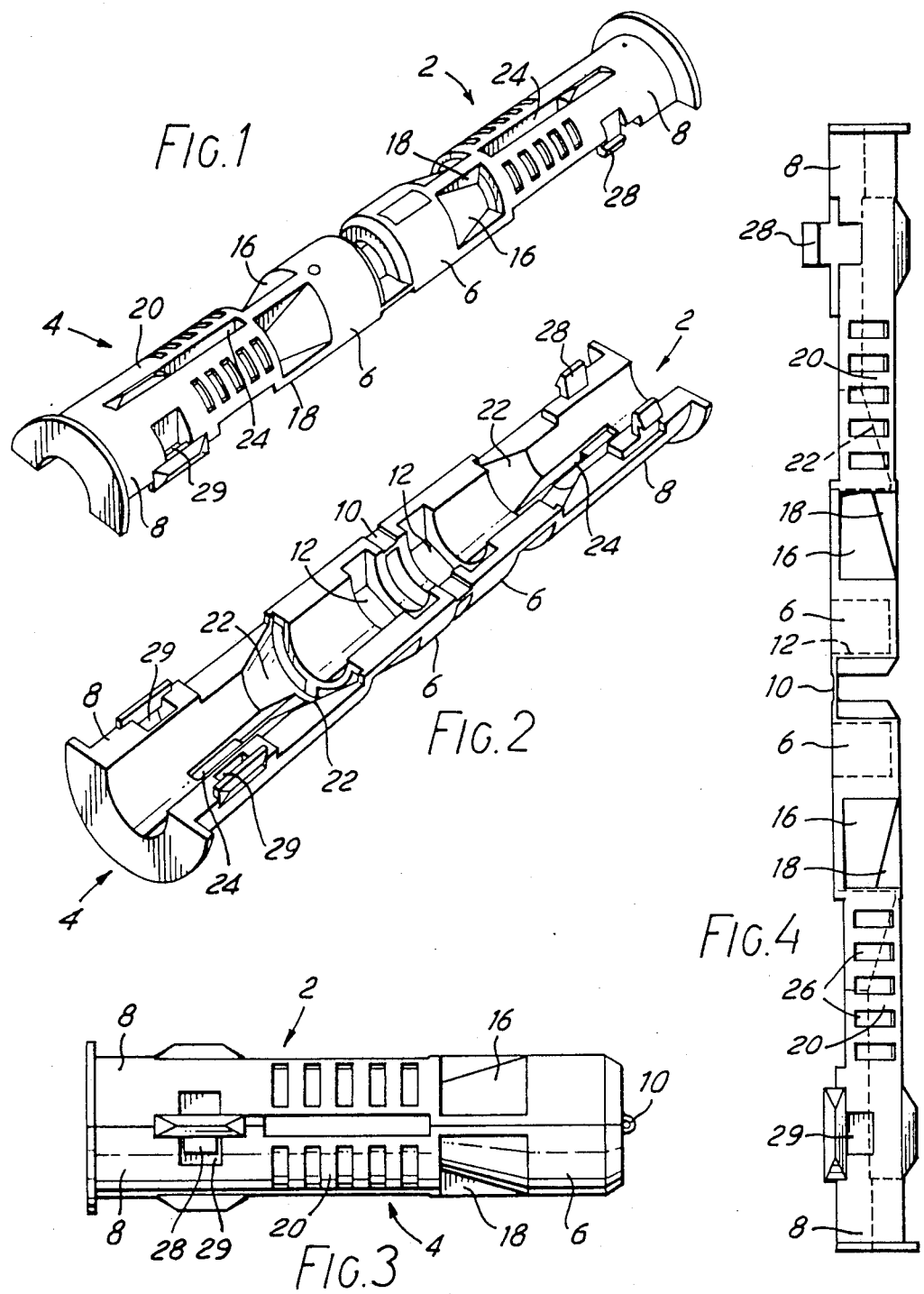

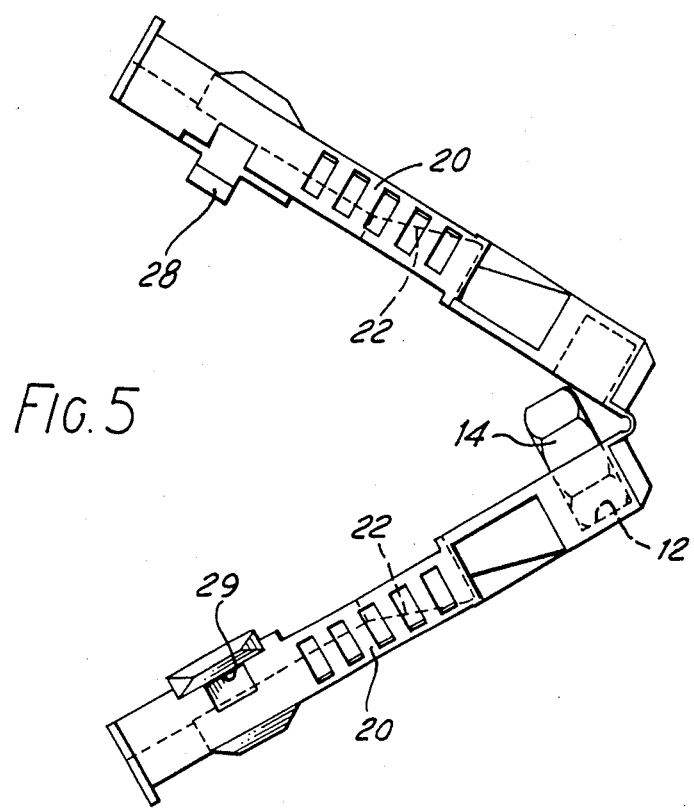
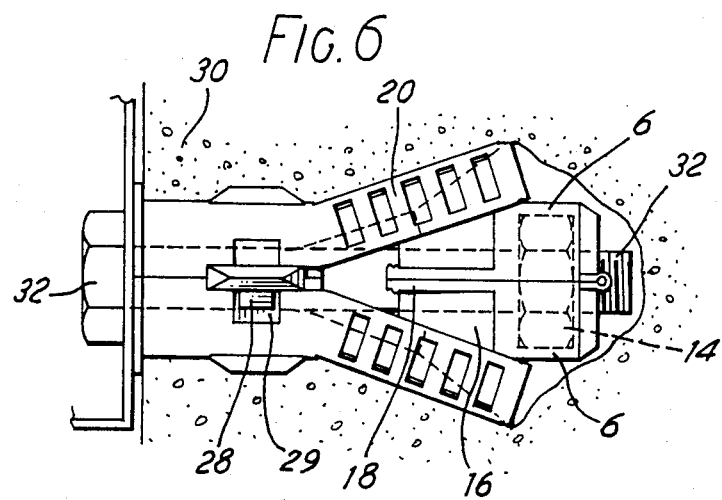

MOULDED FIXING DEVICES

BACKGROUND OF INVENTION

The invention is concerned with improvements in or relating to moulded fixing devices, suitable for use for example with screws bolts or the like fasteners.

Of recent years, the insertion of fasteners into apertures in, say, concrete, and particularly where access is available from only one side, has conventionally involved the use of a tubular sleeve of plastics or other suitable material through which a screw or bolt passes. Some types of sleeve incorporate an internally threaded member attached at the inner end of the sleeve by links which, when the bolt is turned, shear as the member is drawn through the sleeve causing the latter to expand and secure the fastener.

BRIEF DESCRIPTION OF INVENTION

The present invention provides a fixing device moulded from plastics material and comprising a sleeve member formed from two semi-cylindrical sleeve portions, each sleeve portion having a first end portion and a second end portion, the two sleeve portions being initially formed so that a hinge region links the first end portions of each sleeve portion, interengageable securing means being formed at each of the second end portions of the sleeve portion, the construction and arrangement being such that, before use, the sleeve portions are in an initial end-to-end condition and are brought into a condition for use by pivotal movement about the hinge region so as to confront one another and so acquire a substantially continuous cylindrical outer surface, the sleeve portions being retained in confronting engagement with one another by said interengageable securing means.

In examples of fixing devices according to the invention, there is further provided at each of said first end portions of the sleeve portions, a block portion having an internally-threaded, axially arranged bore adapted in use to be engaged by an externally threaded bolt or the like, said block portion having a frusto-conical extension portion tapering in a direction away from the first sleeve end portion and linked by shearable links to an intermediate portion of the sleeve having a frusto-conical internal surface, the construction and arrangement being such that, when the two sleeve portions are brought together about the hinge region, turning the externally threaded bolt will draw the block portion towards the second end portions of the sleeve, shearing the links and forcing the frusto-conical extension portion into the intermediate portion of the sleeve to splay the latter apart along axial slits therein.

Conveniently the block portion comprises a moulded recess within each of the two first sleeve end portions adapted to hold captive a hexagonal nut.

BRIEF SUMMARY OF DRAWINGS

There will now be described in detail, the above-mentioned example of a fixing device of the invention. It will be understood that the description, which is to read with reference to the drawings, is given by way of example only, not by way of limitation.

In the drawings:

FIG. 1 and 2 are perspective views of outer and inner surfaces respectively of the device in its as-moulded condition;

FIG. 3 is a side view of the device folded about a hinge region thereof;

FIG. 4 is a side of the as-moulded device to an enlarged scale;

FIG. 5 shows the device in a partly folded condition together with a nut; and

FIG. 6 is a diagrammatic side view, not to scale, of the fixing device in use in a concrete block.

DETAILED DESCRIPTION OF DRAWINGS

The fixing device comprises a sleeve member comprising two semi-cylindrical sleeve portions 2, 4, each comprising a first end portion 6 and a second end portion 8, the first portion 6 being united at a hinge region 10.

FIGS. 1, 2 and 4 show the device in an as-moulded condition, that is with the two sleeve portions lying in line and linked at their first end portions by the hinge at 10, which hinge is a neck portion of the plastics moulding material which is rendered flexible by reason of its reduced thickness. FIG. 3 shows the device in its assembled form.

In this way, it is possible to produce a fixing device which is complicated in its design yet may be produced with ease using a single moulding step. An example of degree of complexity of design possible is illustrated in the present description.

Referring again to FIGS. 1, 2 and 4, there are provided in each of the two first sleeve end portions 6, recesses 12, which, when the two sleeve portions are brought together, comprise a cavity adapted to receive a nut 14 (FIG. 5) captive therewithin. The first end portions thus provide a block portion (6, 14) having a frusto-conical extension portion 16 tapering in a direction away from the portions 6, and linked by shearable links 18 to an intermediate portion 20 of the sleeve member. Each intermediate portion 20 has an internal part-frusto-conical surface 22 complementing the outer surface of the extension portion 16.

Axially arranged slits 24 are provided in the intermediate portions 20, and roughened external surfaces 26 are provided to enhance keying of the fixing device in use. The second end portions 8 of the sleeve member are provided with interengagement means 28, 29, by which the two sleeve portions 2 and 4 are retained in a confronting condition when hinged about the region 10.

FIG. 6 shows the device in use in a concrete block 30. A bolt 32 is threaded through the nut 14 and, on continued turning of the bolt, relative movement takes place between the nut 14 and the bolt 32 so that the nut moves along the bolt so forcing the block portion 6, 14 to move to the left as viewed in the Figure. The links 18 shear, in a similar manner to that of conventional fixing devices of this kind, and the extension portion 16 forces the intermediate portion 20 of the sleeve to splay so that the fixing device is firmly secured in the concrete 30.

Various modifications may be made within the scope of the invention as defined by the following claims.

We claim:

1. A fixing device moulded from plastics material comprising:

two semi-cylindrical sleeve portions with each sleeve portion having a first end portion and a second end portion;

said sleeve portions together form a sleeve member for receiving in use an externally threaded bolt, a hinge region linking said first end portions of each said sleeve portion so said two sleeve portions initially lie in an end-to-end relationship;

an interengageable securing means formed at each of said two second end portions of said sleeve member, wherein said sleeve portions are brought into a condition for use by a pivotal movement about said hinge region so as to confront one another and thus acquire a substantially continuous cylindrical outer surface;

said sleeve portions being retained in confronting engagement with one another by said interengageable securing means;

a block portion at each of said first end portions of said sleeve portions;

said block portion being initially formed in two sections with each section having a part-frustoconical extension portion tapering in a direction away from said first sleeve end portion and linked by shearable links to an intermediate portion of said sleeve member;

said block portion further including a moulded recess within each of said two sleeve end portions;

said recess being adapted in use to hold captive a nut;

said intermediate portion having axial slits formed therein and being provided with a cavity defined in part by a part-frustoconical internal surface formed when the two sleeve portions are brought together about said hinge region whereby turning the externally threaded bolt threadingly engages said nut causing said nut to move along the externally threaded bolt urging said block portion toward said second end portions of said sleeve portions, shearing said shearable links and forcing the completed frustconical extension portion into said cavity of said intermediate portion of said sleeve member to splay said sleeve member apart, along said axial slits therein.

2. A fixing device as claimed in claim 1 wherein the block portion comprises a moulded recess within each of the two first sleeve end portions said recess being adapted in use to hold captive a hexagonal nut.

3. A fixing device as claimed in claim 1, wherein the hinge region is integrally formed between the two sleeve portions by a neck portion of reduced thickness.

4. A fixing device as claimed in claim 2, wherein the hinge region is integrally formed between the two sleeve portions by a neck portion of reduced thickness.

* * * * *